Figure 8:
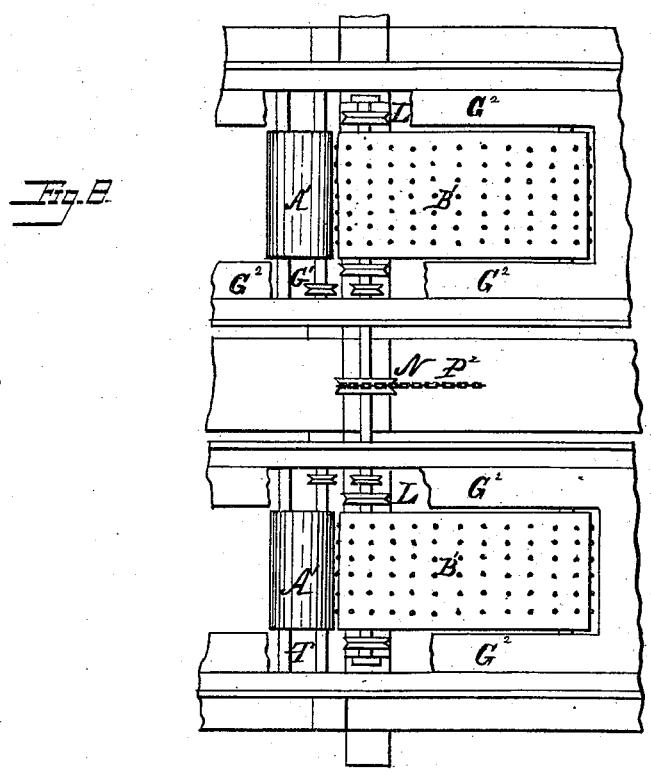

(No Model.) 2 Sheets—Sheet 1.
S. W. HOPE.
CORN HARVESTER.
No. 423,766. Patented Mar. 18, 1890.
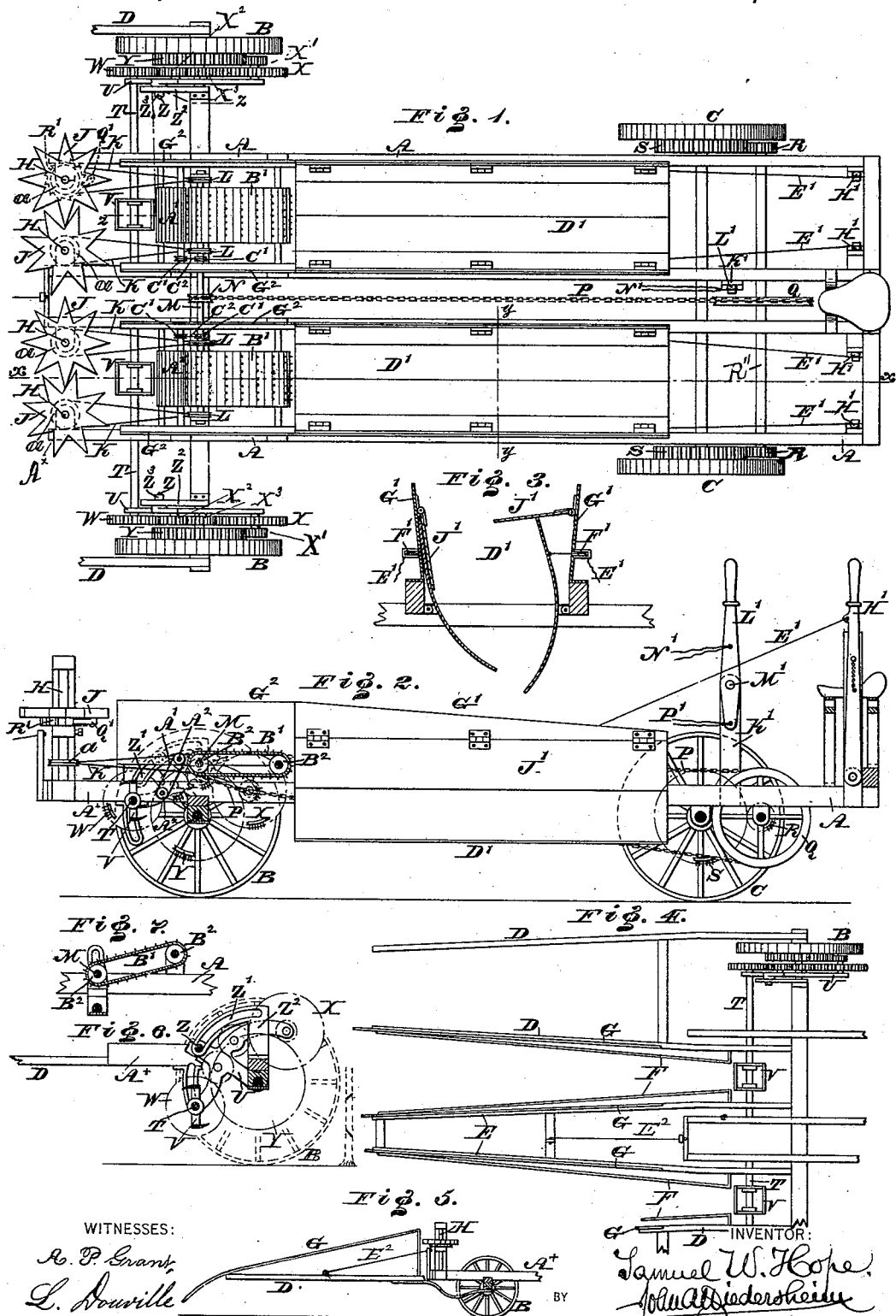
WITNESSES:
A. P. Grant
L. Douville
INVENTOR:
Samuel W. Hope
By John A. Wiedersheim
ATTORNEY.

(No Model.) 2 Sheets—Sheet 2.

S. W. HOPE.
CORN HARVESTER.

No. 423,766. Patented Mar. 18, 1890.

WITNESSES
Robt Aiton
Arthur Hitchcock

INVENTOR
Samuel W. Hope
by J. A. Wiedersheim & Co
Attorney

UNITED STATES PATENT OFFICE.

SAMUEL W. HOPE, OF DOVER, DELAWARE.

CORN-HARVESTER.

SPECIFICATION forming part of Letters Patent No. 423,766, dated March 18, 1890.

Application filed November 12, 1886. Serial No. 218,667. (No model.)

*To all whom it may concern:*

Be it known that I, SAMUEL W. HOPE, a citizen of the United States, residing at Dover, in the county of Kent, State of Delaware, have invented a new and useful Improvement in Corn-Harvesters, which improvement is fully set forth in the following specification and accompanying drawings, in which—

Figure 1 represents a top or plan view of a corn-harvester embodying my invention. Fig. 2 represents a longitudinal vertical section thereof in line $x\,x$, Fig. 1. Fig. 3 represents a transverse vertical section of a portion in line $y\,y$, Fig. 1, on an enlarged scale. Fig. 4 represents a top view of a portion of the front part of the harvester on a reduced scale. Fig. 5 represents a side elevation thereof on a reduced scale. Fig. 6 represents a vertical section of a portion in line $z\,z$, Fig. 1. Fig. 7 represents a vertical section of a detached portion. Fig. 8, Sheet 2, represents a detail view showing the extensions of the cradle.

Similar letters of reference indicate corresponding parts in the several figures.

My invention relates to improvements in corn-harvesters; and it consists, first, in providing the device with mechanism, substantially as described, for imparting motion to the gatherers in addition to that imparted by the contact of the stalks, said mechanism consisting of a rotary sleeve operated by the running-gear of the device and having a pinion secured thereon and engaging a pawl on the gatherers of the harvester, the said gatherers being loosely mounted on the shaft on which the said sleeve is mounted.

It further consists of a cradle having longitudinally-opening jaws' pivoted to the frame of the machine and provided with flaps pivoted to the guards and operated by the movements of the jaws, substantially as described.

It further consists of the combination of parts herein set forth and claimed.

Referring to the drawings, A represents the frame of the harvester; B, the front wheels; C, the hind wheels; and D, the shafts, which, in the present case, are two in number, so that the harvester may be drawn by two horses or animals. Attached to the inner sides of the inner shafts D and the frame E, which latter is between the said inner shafts, are guides or guards F, which are so constructed that their inner ends are nearer together than their outer ends, thereby serving to guide the stalks toward the gatherer J and cutters V, while at the same time protecting the said shafts D and frame E from wear by contact with the stalks. To said parts D E are secured fingers G, which project forward, and are bent down at the front end so as to approach the ground, the object of said fingers being to pass under the corn when low and raise the same. A brace-rod $E^2$, attached to the frame A, aids in keeping the shafts in horizontal position.

In arms $A^\times$ of the frame A, and at the front end thereof, are journaled vertical rotary shafts H, on which are mounted toothed wheels or gatherers J, said wheels overlapping each other. The shafts H carry pulleys $a$, around which pass belts or bands K, the latter passing around pulleys L on a shaft M, whose bearings are on the frame A, said shaft M carrying a pulley N, which is operated by a chain or band P, a pulley Q, and pinions R S, the pinions S being secured to the hind wheels C, the pulley Q and pinions R being connected with a shaft $R''$, which is properly mounted on the frame A, near the rear of the harvester.

T represents transversely-extending shafts, which are journaled in one of the limbs of the angular arms U, as shown in Fig. 6, the said arms being pivotally mounted on the front axle of the harvester at the rear of the gatherers J. Secured to said shafts are cutters V, which consist of two or more horizontal blades attached to arms or heads which are fastened to the shafts T. On the outer end of each of the shafts T is rigidly secured a pinion W, meshing with a train of gearing consisting of three wheels X $X^2$ $X^3$, suitably journaled on the arm U. On the shaft of the last wheel of the train X is a pinion X', meshing with the spur-wheel Y on the axles of the front wheels, whereby a downward stroke is imparted to the cutters V.

The arms U carry pins Z, which enter segmental slots Z' in arms $Z^2$, secured to the arms of the frame A. (See Fig. 6.) By this provision the arms U may be raised and lowered, so that the height of the cutters V may be adjusted. When the adjustment is accomplished, the arms are securely held by means of nuts Z³ on the pins Z. (See Fig. 1.)

A' represents endless aprons, which occupy inclined positions at the front of the machine, and are sustained on rollers A², which are mounted on the frame A at the rear of the cutters V.

B' represents endless aprons, which occupy horizontal positions and are sustained on rollers B², the latter being mounted on the frame A behind the aprons A', the faces of said aprons being serrated. The front rollers B² are secured to the shafts M, whereby motion is imparted to said aprons B'. The shafts M transmit power to the shafts of the rollers A² by means of pulleys C' and belts C², and thus motion is imparted to the aprons A'.

D' represents a cradle, which is formed of jaws pivoted to the frame A, extending in longitudinal direction and located behind the aprons B'. Attached to the cradle above their pivots are cords or chains E', which pass through pulleys F', mounted on guards G', which rise from the frame A outside of the cradle, said cords extending to levers H', which are pivoted to the frame adjacent to the driver's seat, whereby by operating said levers the cradle may be readily opened below, so as to discharge its contents. The guards G' are extended forward, the extensions G² occupying positions at the sides of the aprons, so as to direct the cut stalks to the main apron and cradle. Pivoted to the upper ends of said guards G' are flaps J', which overhang the jaws of the cradle and rest thereon in such manner that when the cradle is opened the flaps are raised by the rising of the jaws due to the operation of the levers H' and cords E', as will be seen at the right side of Fig. 3. When the cradle is closed, the flaps fold down on the same of their own weight, as will be seen at the left hand of Fig. 3.

Rising from the frame in front of the driver's seat is a standard K', to which is pivoted a lever L', having the off-rein of each horse attached to the upper part and the right reins to the lower part thereof, or vice versa, thus providing a device for driving the animals without requiring the reins to be held in the driver's hands, it being noticed that the driver has to operate the cradle-levers H' as well as guide the horses, and thus both operations may be conveniently and effectively accomplished.

The toothed wheels or gatherers J are loosely fitted on the shafts H, and have pivoted to them pawls Q', which engage with ratchets R', secured to said shafts, so that as the ratchets receive motion from said shafts H they engage with the pawls Q' and cause the rotation of the wheels or gatherers J. Should either of the sets of overlapping gatherers be crowded, so as to be moved faster than the revolving shafts, the pawl readily slides over the teeth of the ratchet, and there is no strain on the ratchet or connected parts.

It will be seen that when the harvester is advanced to the standing corn the stalks are directed by the guides F to the rear end thereof, whereby they are gathered at said end, assisted by the wheels J, between which said stalks are temporarily clamped and by which they are properly inclined. When the stalks clear the wheels J, they are reached by the cutters V and severed, leaving stubs in the ground, which are further cut off or reduced, owing to the continued rotation of said cutters. As the stalks lose their support, they fall against the inclined aprons A', and are carried by the same to the aprons B' and unfailingly conveyed by the teeth of the same into the cradle D', which are now in closed condition. Ears of corn, leaves, &c., also fall on the apron A', and are conveyed to the apron B', thus preventing clogging of the machines and the cutters. When sufficient quantity of stalks are gathered in the cradle, the cords E' are let go (by advancing the levers H') and the jaws open at the bottom, thus discharging the cradle of its load. Simultaneously with the opening motion of the jaws the flaps J' are raised by contact with the upper portion of the jaws, whereby they close the top of the cradle and form a temporary support for the succeeding stalks which leave the apron B', thus preventing a strewing of the said stalks along the ground. As soon as the jaws are cleared they are closed by the driver by drawing back the lever H', and thereby the cord E', whereby the flaps drop and the stalks just resting thereon fall into the cradle. As soon as the cradle is again sufficiently full, it is permitted to open, and the subsequent operations are similar to those hereinbefore stated.

In Fig. 7 the endless apron B' has one of its rollers mounted on a shaft which has slotted bearings, whereby the said shaft may be vertically adjustable, so as to adapt said apron to be set inclined at various angles to the inclined apron A'.

Having thus described my invention, what I claim as new, and desire to secure by Letters Patent, is—

1. In a corn-harvester, vertical shafts with ratchets rigidly connected therewith, overlapping gatherers loosely mounted on said shaft and provided with pawls adapted to be engaged by said ratchets, and mechanism, substantially as described, connected to and operated by the running-gear of the harvester for rotating said shafts, said parts being combined substantially as and for the purpose set forth.

2. In a corn-harvester, a frame with arms projecting forwardly therefrom, vertical rotary shafts having their bearings on said arms and provided with ratchet-wheels secured thereto, overlapping gatherers loosely mounted on said shafts, said gatherers having pawls secured thereto, pulleys on said shaft, mechanism, substantially as described, connected to and intermediate of said pulleys, and the hind wheels of the running-gear of the harvester for imparting a rotary motion to said gatherers, said parts being combined substantially as and for the purpose set forth.

3. In a corn-harvester, the frame A, with forwardly-projecting arms A$^\times$, having the shafts H mounted thereon and provided with the ratchets R', the overlapping gatherers J, loosely mounted on said shafts and provided with pawls engaging said ratchets, the pulleys $a$, mounted on said shaft H, the shaft M, with pulleys L and N thereon, a shaft with the pulley Q thereon and the pinion R, the pinion S on wheels C and meshing with the pinion R, and bands or belts uniting said pulleys $a$ and L and pulleys N and Q, said parts being combined substantially as and for the purpose set forth.

4. A corn-harvester consisting of revolving vertical shafts, ratchets secured to said shafts, overlapping gatherers on the upper portion of said shafts and provided with pawls, rotating cutters in the rear of said gatherers, inclined endless aprons in the rear of said cutters, cradles with longitudinally-pivoted jaws in the rear of said aprons to receive the corn from the aprons, guards for said cradles and aprons extending along the sides thereof, and cords and levers to operate said jaws, said parts being combined substantially as described.

5. In a corn-harvester, the frame A, having slotted arm Z$^2$, in combination with pivoted arm U, with stud Z, the guides F, the inclined endless apron A', the toothed endless apron B', and cradle D', with guards G', substantially as described.

6. In a corn-harvester, a cradle consisting of longitudinally-opening jaws pivoted to the frame, guards, and flaps pivoted to the guards and operated by the movement of the jaws and adapted to close said cradle at the top when the said jaws are opened, said parts being combined substantially as described.

7. A corn-harvester having a cradle with the guards G', pivoted jaws secured to the frame and opening longitudinally, mechanism, substantially as described, connected to said jaws for closing the same, the flaps J', pivoted to said guards and above said jaws, said flaps being in contact with the upper portion of said jaws and adapted to close said cradle at the top when said jaws are opened, said parts being combined substantially as described.

8. In a corn-harvester, the adjustable angular arm U, pivotally mounted on the front axle of the harvester, the shaft T, having its outer end journaled in the said angular arm, and its inner end in the frame and having horizontal blades secured to cross-heads fixed on the said shaft, and the pinion W, fixed thereon at the outer end, a train of gearing consisting of pinions X X$^2$ X$^3$, having their journal-bearings in the arm U, the pinion X', mounted on the shaft of the last wheel of the train, and the spur-wheel Y on the front supporting-wheel B and meshing with said pinion X', said parts being combined substantially as described, whereby relatively to the stalks a downward-cutting motion is imparted to the cutter.

S. W. HOPE.

Witnesses:
JOHN A. WIEDERSHEIM,
A. P. GRANT.